(12) United States Patent
Mostafa et al.

(10) Patent No.: US 7,493,129 B1
(45) Date of Patent: Feb. 17, 2009

(54) METHOD AND APPARATUS TO MAINTAIN NETWORK COVERAGE WHEN USING A TRANSPORT MEDIA TO COMMUNICATE WITH A REMOTE ANTENNA

(75) Inventors: Ayman Mostafa, Smyrna, GA (US); Mark Austin, Guaynabo, PR (US); John Carvalho, Ruscombe (GB)

(73) Assignee: AT&T Mobility II LLC, Atlanta, GA (US)

( * ) Notice: Subject to any disclaimer, the term of this patent is extended or adjusted under 35 U.S.C. 154(b) by 781 days.

(21) Appl. No.: 10/661,196

(22) Filed: Sep. 12, 2003

Related U.S. Application Data (60) Provisional application No. 60/410,136, filed on Sep. 12, 2002.

(51) Int. Cl.
*H04B 7/00* (2006.01)
(52) U.S. Cl. .................................. 455/502; 455/67.16
(58) Field of Classification Search ............. 455/67.11, 455/67.16, 63.1, 560, 502, 503
See application file for complete search history.

(56) References Cited

U.S. PATENT DOCUMENTS

| | | | | |
|---|---|---|---|---|
| 4,411,007 | A * | 10/1983 | Rodman et al. | ............. 375/356 |
| 5,809,397 | A | 9/1998 | Harthcock et al. | |
| 6,389,264 | B1 * | 5/2002 | Halonen | ................... 455/67.11 |
| 6,427,075 | B1 * | 7/2002 | Burg et al. | ............... 455/422.1 |
| 6,535,732 | B1 | 3/2003 | McIntosh et al. | |
| 6,539,239 | B1 | 3/2003 | Loughran et al. | |
| 6,594,245 | B1 * | 7/2003 | Rimhagen et al. | ........... 370/337 |
| 6,728,486 | B1 | 4/2004 | Hutchison et al. | |
| 6,801,767 | B1 | 10/2004 | Schwartz et al. | |
| 6,826,163 | B2 | 11/2004 | Mani et al. | |
| 6,831,901 | B2 | 12/2004 | Millar | |
| 2002/0030870 | A1 | 3/2002 | Aburakawa et al. | |
| 2002/0048071 | A1 | 4/2002 | Suzuki et al. | |
| 2002/0075906 | A1 | 6/2002 | Cole et al. | |
| 2002/0094842 | A1 | 7/2002 | Aburakawa et al. | |
| 2002/0132612 | A1 | 9/2002 | Ishii | |
| 2002/0181668 | A1 | 12/2002 | Masoian et al. | |
| 2002/0197986 | A1 | 12/2002 | Goss et al. | |
| 2003/0007214 | A1 | 1/2003 | Aburakawa et al. | |
| 2003/0030863 | A1 | 2/2003 | Frey et al. | |
| 2003/0061422 | A1 * | 3/2003 | Repice et al. | ................ 710/107 |

(Continued)

OTHER PUBLICATIONS

Distributed Antenna Systems Plus Software Radio: Range Extension and Other Benefits, Bose et al.*

(Continued)

*Primary Examiner*—Edward Urban
*Assistant Examiner*—Raymond S Dean
(74) *Attorney, Agent, or Firm*—Zagorin O'Brien Graham LLP (57) ABSTRACT

In a cellular communications system having a centralized radio processing portion (a base station hotel) in communication with a plurality of remote air interface radio portions (or radio heads) over a transport medium, the centralized radio processing portion compensates for a fixed delay associated with the transport medium coupling the centralized radio processing portion and one of the remote air interface radio portions when evaluating a time period corresponding to a variable delay between transmission by a mobile in communication with the one of air interface radio portions and receipt of the transmission by the centralized radio processing portion. The variable delay may relate to time out periods or time slot synchronization.

19 Claims, 9 Drawing Sheets

U.S. PATENT DOCUMENTS

| | | |
|---|---|---|
| 2003/0072055 A1 | 4/2003 | Mickelsson et al. |
| 2003/0078074 A1 | 4/2003 | Sesay et al. |
| 2004/0001719 A1 | 1/2004 | Sasaki |
| 2004/0005897 A1 | 1/2004 | Tomoe et al. |
| 2004/0017785 A1 | 1/2004 | Zelst |
| 2004/0037565 A1 | 2/2004 | Young et al. |
| 2004/0198451 A1 | 10/2004 | Varghese |

OTHER PUBLICATIONS

U.S. Appl. No. 10/661,197, filed Sep. 12, 2003, entitled "Base Station Architecture and Digital Transport System for Connecting Remote Radioheads to a Central Host Via a Transmission Medium", Inventor(s): Ayman Mostafa and Mark Austin.

Final Office Action mailed Feb. 2, 2007 for U.S. Appl. No. 10/661,197, 16 pages.

* cited by examiner

METHOD AND APPARATUS TO MAINTAIN NETWORK COVERAGE WHEN USING A TRANSPORT MEDIA TO COMMUNICATE WITH A REMOTE ANTENNA

CROSS-REFERENCE TO RELATED APPLICATION(S)

This application claims the benefit under 35 U.S.C. § 119 (e) of provisional application 60/410,136, filed Sep. 12, 2002, which application is incorporated herein by reference.

BACKGROUND

1. Field of the Invention

This invention relates to wireless communication systems and in particular to timing and delay periods in wireless communication systems.

2. Description of the Related Art

Wireless communication systems utilize a timeout period in which the base station expects to hear from the mobile station. If the base station does not hear from the mobile station within the timeout period, then the mobile station assumes the transmission has ceased. In addition, time division multiple access (TDMA) wireless systems assign transmission time slots to mobile stations and track the delay of each mobile station. In such systems, transmission timing of the mobile stations are adjusteds, forward or backwards, based on a reception of transmissions from the mobile station to maintain all the digital time slots synchronized and prevent adjacent users from having signals that overlap each other when they arrive at the base transceiver station (BTS).

For example, if user 2 in timeslot 2 is located directly under the cell site (where the base transceiver station is located) and user 1 is many miles away from the base station and is transmitting on timeslot 1, the time that it takes for the signal to arrive from user 1 at the base transceiver station is longer than the time it takes for user 2 transmissions to arrive given their different locations with respect to the cell site. The problem can arise that unless some timing adjustment is made for when user 1 should transmit, that the signal from user 1 in timeslot 1 can start to "overlap" in time with that being transmitted from user 2 in timeslot 2. The solution utilized by current systems is for user 1 in timeslot 1 to "advance" its timing, thereby causing user 1 transmissions to arrive earlier and ensuring that they do not interfere with timeslot 2.

For example, in Global System for Mobile Telecommunications (GSM) the delay is know as Timing Advance (TA), which has allowable values of 0, . . . , 63. One TA unit is equal to one GSM bit (3.7 µs). The electromagnetic waves travel at 1.1 Km/bit. That results in a round trip distance of 1.1×64=70 Km or 35 Km cell radius or a round trip delay of 64×3.7 µs=236 µs. Therefore in GSM the maximum cell size is limited to 35 kilometers, as this is the maximum timing advance that is allowed.

Figure 1:
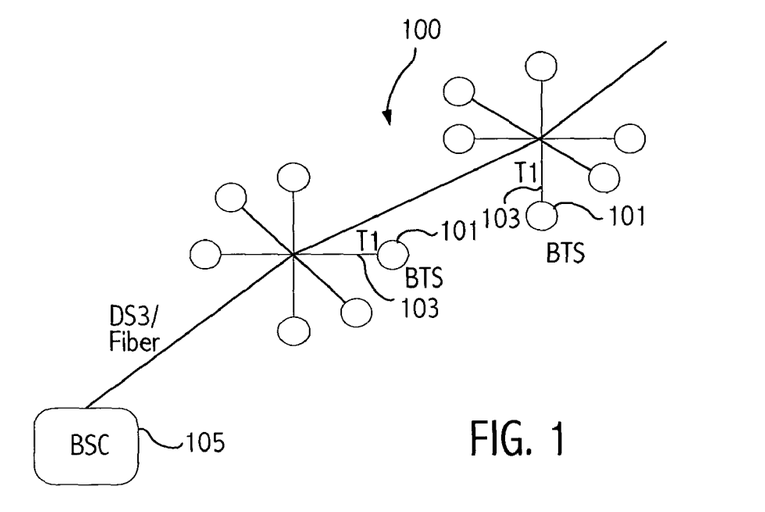
FIG. 1 illustrates a traditional architecture of a mobile communication system.

Referring to FIG. 1, a traditional architecture is illustrated that has distributed base transceiver stations 101 around the network 100 with multiple T1's 103 to each site. A base station controller (BSC) 105 controls multiple base transceiver stations 101. While the traditional architecture is functional for current needs, it lacks the ability to share radio resources efficiently. For example, in one major metropolitan network, the busy hour traffic carried is about 26 K Erl., while the network has 60 K voice paths (while being ~99% digital). That suggests an approximately 26/60=43% efficiency in voice paths (capital).

Consequently, while the mobile switching center (MSC) switch may handle a certain load (simultaneous voice paths) during the busy hour, it is very common that it takes double the amount of effective voice paths in the deployed BTS's to handle the same net load on the switch. This is due to two reasons; 1) the individual cells have slightly different busy hours, and 2) there are no shared resources across BTS's for improving the trunking efficiency.

With new spectral efficiency improvements such as advanced multi-rate (AMR) in Global System for Mobile Telecommunications (GSM), and the newly approaching 3G technologies such as Enhanced Data Rates for Global Evolution (EDGE), it is expected that base stations will become commonplace that support the traffic equivalent of up to 20 TRX's per sector (in greater than 2×10 MHz bandwidths, and assuming full-rate AMR) with speeds of up to 473 kbps per EDGE TRX. Although these types of capacities and bandwidths are possible with the network architecture and building blocks of today's cell sites, they seem somewhat inefficient for meeting the high transmitter/receiver (TRX) demand and high backhaul requirements of these systems. Indeed, today's base transceiver station (BTS) deployments are entirely distributed where each one is dimensioned independently for the traffic load it carries in a given busy hour per day.

There are two fundamental areas that operators of mobile communication systems attempt to improve on over time, namely capital expenditures (CAPEX), and operating expenditures (OPEX). Under current deployment strategies, capital expenditures are expected to grow at a constant rate vs. an incremental minute-of-use (MoU) on the network. Unfortunately, the current base station architectures do not lend themselves towards improving OPEX as much as would be desired in a synthesized hopping network, since radios (with single channel amplifiers) must be combined using lossy combiners which results in a coverage loss unless additional coax cables are hung on the tower. In addition, every time more radios are added, the real estate footprint of the cell site itself grows as well, adding additional rent and lease expense (typical in those situations where outdoor shelters are utilized). Additionally, as Enhanced General Packet Switched Radio Service (EGPRS) packet data becomes fully deployed in the network, the number of effective T1 lines (i.e., the required transport bandwidth) between the base station controller (BSC) and the base transceiver station (BTS) is expected to increase significantly.

Due to these increasing OPEX costs, and no perceived improved CAPEX savings over time, it would be desirable to provide an alternative architecture to help reduce both CAPEX and OPEX for an evolved network. However, that can also have implications for timing advance timeout periods. Accordingly, it would be desirable to provide a centralized architecture that can also appropriately deal with timing advance and timeout issues.

SUMMARY

Accordingly, in one embodiment, the invention resolves limitations of Time Advance (TA) in a wireless system (e.g. in GSM, TDMA CDMA) when the cell site antenna is remotely located away from processing functionality and the signal to the antenna undergoes a certain delay, which can reduce the cell radius and limit the radio coverage of the cell and the network. Further, limitations associated with delays between processing functionality and the cell site antenna for time out periods are also resolved.

In an embodiment, in a cellular communications system having a centralized radio processing portion (a base station hotel) in communication with a plurality of remote air interface radio portions (or radio heads) over a transport medium, the centralized radio processing portion compensates for a fixed delay associated with the transport medium coupling the centralized radio processing portion and one of the remote air interface radio portions when evaluating a time period corresponding to a variable delay between transmission by a mobile in communication with the one of air interface radio portions and receipt of the transmission by the centralized radio processing portion. The variable delay may relate to time out periods or time slot synchronization.

In another embodiment a cellular communication system is provided that includes a host processing part (a base station hotel) coupled to receive a communication over a transport medium from a remote air interface part (a radio head), the host processing part determining a time interval between transmission by a mobile station in communication with the remote air interface part (RH) and receipt of the transmission at the host processing part, the host processing part compensating for a fixed delay associated with the transport medium coupling the host processing part and the remote radio interface part in evaluating the time interval.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
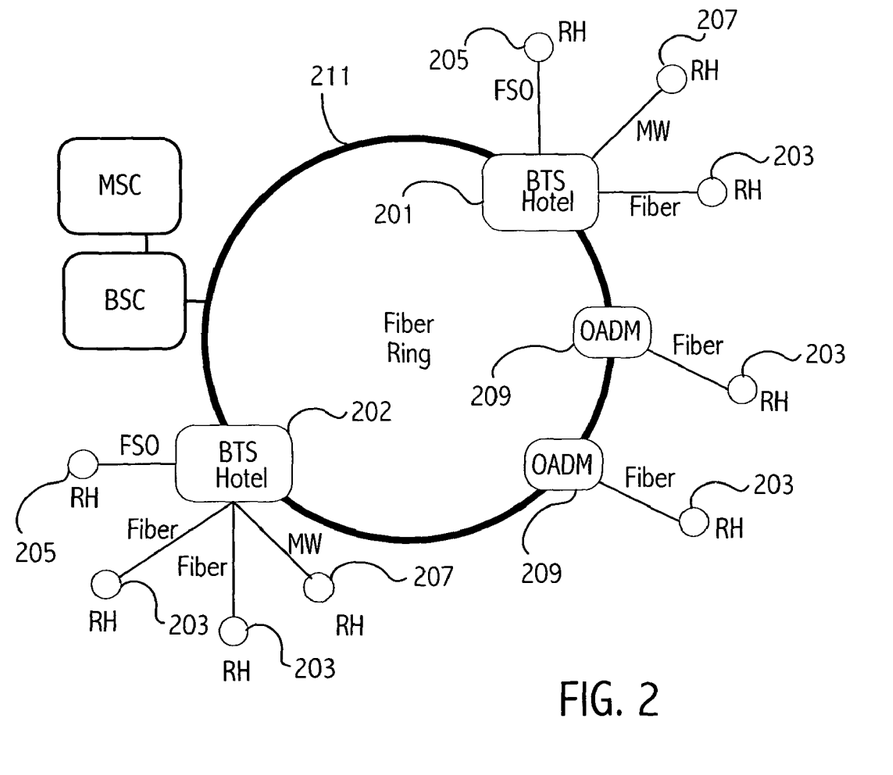
FIG. 2 illustrates an architecture with fiber based concentrators according to an embodiment of the invention.

The centralized architecture shown in FIG. 2 allows sharing of radio resources for cell sites from a central location. Such an architecture provides the potential for significant hardware savings since pooled-radio/channel processing units can be shared across multiple cell sites. The centralized architecture can provide centralized management, which can provide savings in operation and maintenance as well as lending itself to utilization of software defined radio concepts. The architecture illustrated in FIG. 2 utilizes centralized base station hotels 201 and 202 (also referred to herein as hosts), and replaces today's base transceiver stations (BTS's) by much simpler radio heads (RHs). In one embodiment, the RHs provide little more than digital/analog (D/A) conversion and radio/frequency (RF) amplification and filtering.

One goal of the architecture described herein is to provide a ubiquitous and affordable access to each RH by its BTS host. Referring again to FIG. 2, according to an embodiment, the BTS's are concentrated into a few locations, e.g. BTS 201 and 202 and are coupled with remote "dumb" radio heads 203, 205, and 207 at the required RF emitting locations. Site-specific processing units are kept at the BTS hotel point. Preferably, there are only a few BTS hotels in a typical metropolitan area and they should preferably exist at the POP points (points of presence) or at a Mobile Telephone Switching Office (MTSO) location to minimize the cost of cross-connect between BSC/MSC and BTS host. From the transport point of view, the BTS hotel concentrates the transport signal of the individual sites to aggregate the traffic to the BSC. For that reason the BTS hotel could preferably be located with or close to the BSC.

The distribution between the BTS host and RH's can be any high bandwidth medium. For example, as shown in FIG. 2, connection between BTS hotel 202 and RH 205 could be implemented through a line of site wireless link utilizing free space optics (FSO). Also, connection between BTS hotel 202 and RH 207 could be implemented through microwave (MW) communications. However, in many cases, no line of site exists, so that alternative backhauls such as fiber optics can be utilized. Use of optical fiber as the transport medium has several technical advantages. For example, optical fiber does not exhibit fading or multiple path impairments. Further, its performance is not a function of the weather or geographical changes. Optical fiber distribution can also be particularly attractive due to its bandwidth potential, and relative abundance in metro areas. While many of the examples provided herein utilize optical fiber, note that the concepts described herein are also applicable to other high bandwidth mediums. In one embodiment, the digital transport is point to multipoint. Note that the BTS host and RH architecture may be based on Software Design Radio concepts, which provides the capability of supporting multiple communication standards on the same platform.

Although examples provided herein explaining transmitting RF over fiber in accordance with embodiments of the invention are described primarily for GSM, they are equally relevant for other technologies such as time division multiple access (TDMA), code division multiple access (CDMA), wide band CDMA (WCDMA) and orthogonal frequency division multiplexing (OFDM) across any bands.

Figure 3:
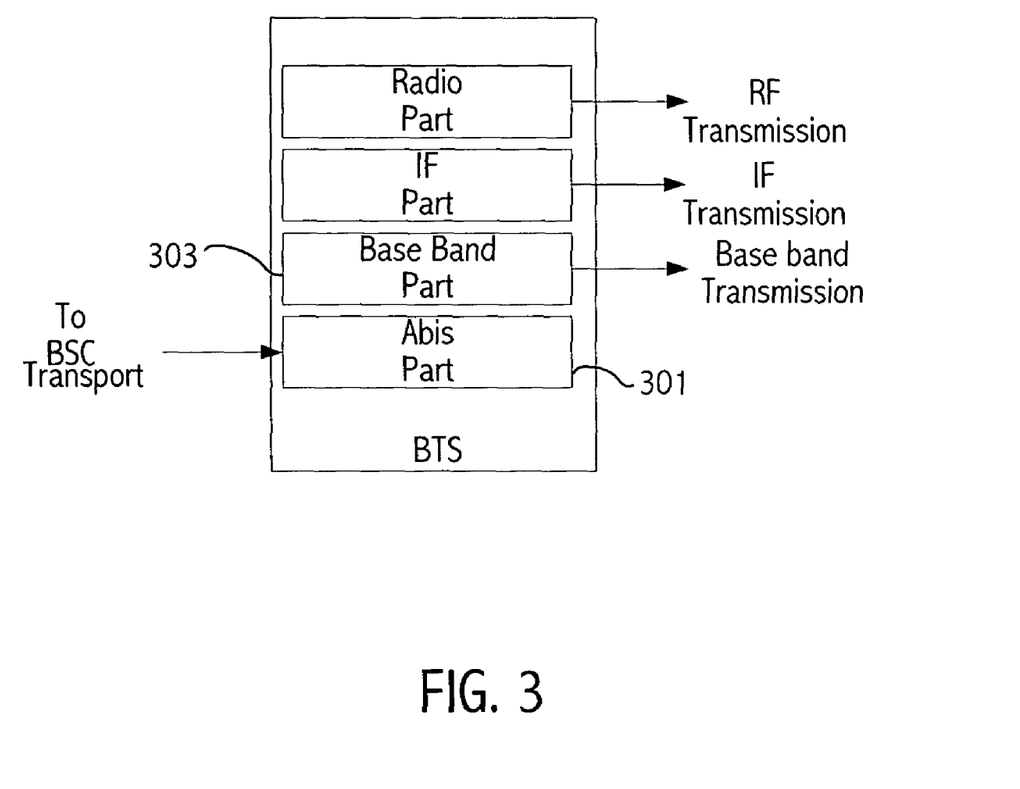
FIG. 3 provides the hardware-layered structure architecture of a traditional base transceiver station.

There are several BTS Hotel/RH transmission options for RF over fiber. Implementing a transmission option entails determining an appropriate dividing point for the traditional BTS design into a BTS host and RH where the tradeoff is between backhaul bandwidth requirements and complexity (and expense) of the RH. FIG. 3 provides, from a hardware perspective, the hardware-layered structure architecture of a traditional base station to provide a framework for the discussion of the various possible dividing points to break the traditional BTS design into a BTS hotel and the RH. One part of the hardware structure is the Abis interface 301 that provides the communication interface with the BSC/MSC. A second part of the hardware structure 303 provides base band/DSP processing. A third part of the hardware structure 305 provides intermediate frequency (IF) processing and the fourth part of the hardware structure provides the radio part 307 for RF transmission.

Several options are provided below for an appropriate dividing point between the BTS hotel and the radio head. Assume (for an embodiment) that the RF, IF, or base band data signal is transformed into an optical signal and transmitted over a fiber optic link. On the remote end, the optical signal is converted back to RF, IF, or a data signal and then processed, amplified and sent to the antenna. The following section gives an overview of the bandwidth requirement for each case.

One option is to transmit RF signals over fiber. That transmission option is considered analog over fiber. The RF carriers modulate the optical signal through the fiber. Since the modulation is based on laser intensity, no other digital data signal can be modulated and used along with the RF in the fiber. Note that electric to optic (E/O) and optic to electric (O/E) conversion loss in addition to the long haul fiber loss could result in significant RF loss that would reduce the spurious free dynamic range (SFDR) of the receiver. Thus, transmission of this sort may be regarded as distance-limited.

Another option is for transmission of intermediate frequency signals over the fiber. In this case the bandwidth (BW) required can be estimated as follows. Assume a 12.5 MHz over IF signal for the downlink, with 52 mega samples per second (MSPS). Using commercially available analog/digital (A/D) converters the required bandwidth is 52 MSPS*14 bits/samples~730 Mbps for the downlink. Assuming receiver diversity for the uplink, twice that bandwidth or 2*730 Mbps is needed. The total BW per site would be 730*3~2190 Mbps plus overhead site specifics, parameters, alarms and the like. Thus, transmission of intermediate frequency signals over fiber utilizes OC-48 BW capability (2.4 Gbits/s) per site.

Another option is for baseband transmission of RF over fiber. With this approach, only the traffic data to the specific site is carried over the fiber. In one embodiment, the composite signal to every site is built at the BTS host and transported to the RH over the fiber link. The estimated BW per carrier is dependent on the technology. For GSM, the air interface BW is about 270 Kbps, while for WCDMA it is 3.84 Mbps. Higher transport bandwidth requirements may be required according to whether synchronization is maintained in the radio head or in the BTS hotel. The baseband option results in the lowest backhaul requirements, as a tradeoff for slightly higher complexity in the RH's since each radio head now provides IF processing capability. The BTS host and RH architecture themselves for this option are described in more detail in the following sections.

Figure 4:
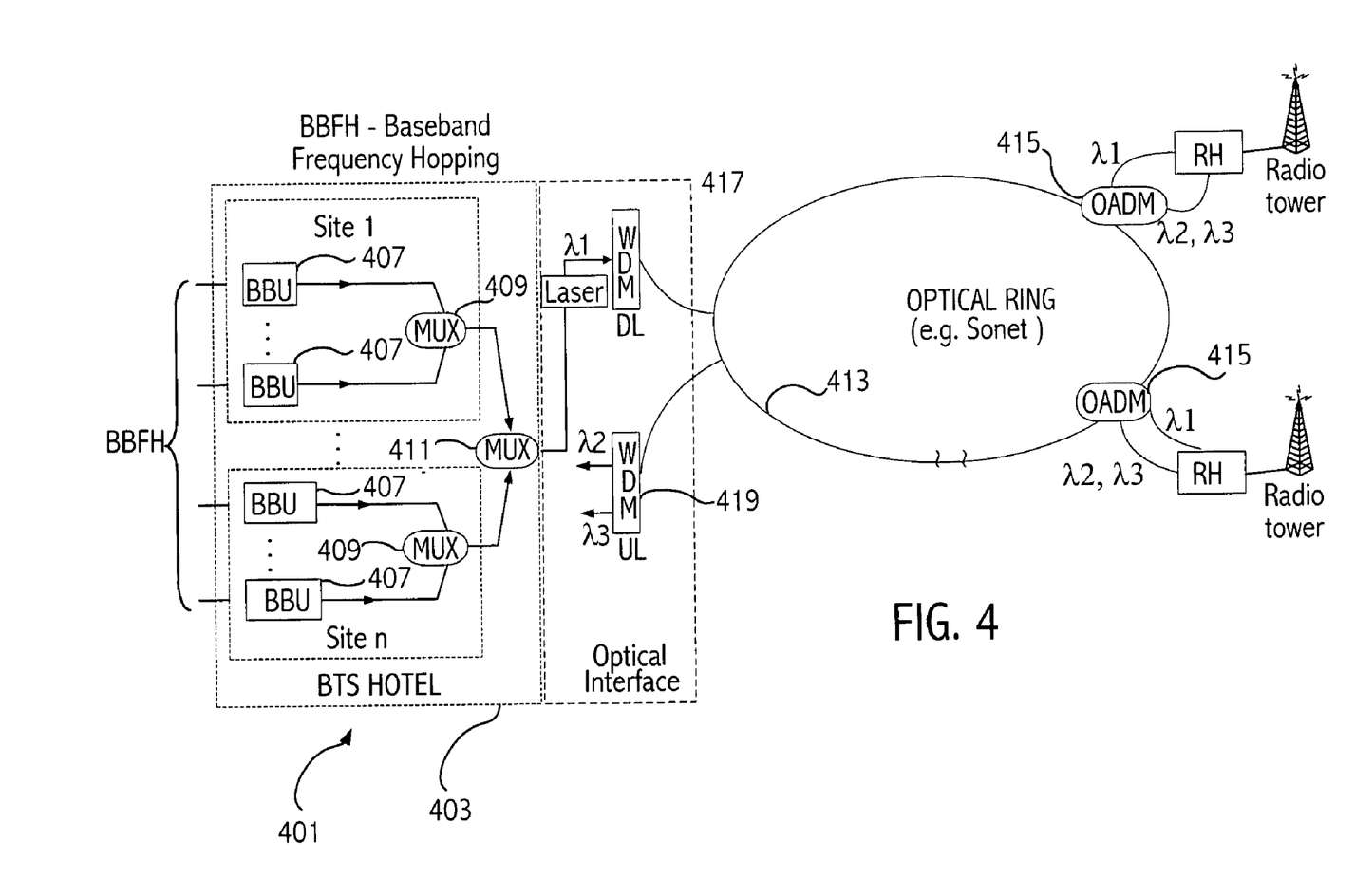
FIG. 4 illustrates functionally an architecture including a BTS host coupled to remote radioheads according to an embodiment of the invention.

FIG. 4 illustrates functionally an embodiment of a BTS host 401 (hotel) for a baseband transmission strategy. The sites (Site 1. Site n) 403 represents the base band radio resources needed for given cell site at a particular time. Each site corresponds to a RH supported by the BTS host. The baseband units (BBU) 407 process the traffic/control signals for its site (site 1 or site n). There are two levels of multiplexing in the illustrated embodiment. The first level of multiplexing is represented by multiplexers 409. The multiplexers 409 are on the site level and multiplex all channels within one site. Thus, the baseband processing occurring for all the channels of the site are selectively multiplexed by multiplexers 409. A second level of multiplexing is represented by multiplexer 411 and occurs at the BTS host level. Multiplexer 411 functions to multiplex baseband signals for the multiple sites supported by host 401 for transmission over optical ring 413.

As illustrated in FIG. 4, the BTS host 401 provides a central location for pooling the radio processing units of all channels in the network. Preferably, there are one or two BTS hosts in the whole network. In a large network, such as those of a big metropolitan area, a few BTS hosts are practical. The numbers and locations of BTS hosts depend on the number of the RHs and their locations. BTS hosts can also be used to provide redundancy to the network in case of transport failure or power outage. However, such redundancy typically requires extra transport cost. Note that the embodiment illustrated in FIG. 4, some or all of the baseband processing capability may be dedicated to a particular site.

In an embodiment implementing baseband transmission over fiber, the IF/RF sections of the BTS radio are located remote from the host and close to the tower in the RH. Each RH could have one or a multiple number of sectors.

In one embodiment wavelength division multiplexing (WDM) is used to combine one or more wavelengths over fiber 413. Different wavelength multiplexing schemes can be used depending on the transported data rate: For example, one wave length division multiplexing scheme is known as Coarse Wave Division Multiplexing (CWDM). Another wave length division multiplexing scheme is known as Dense Wave division multiplexing (DWDM). CWDM combines a relatively low number of wavelengths (e.g. 6), while DWDM combines 32 wavelengths in protected mode (i.e. for every wavelength, a back-up wavelength is also transmitted for failure protection) and 64 in non-protected mode. Referring still to FIG. 4, Optical Add and Drop Mulitplexers (CWDM) 415 are used to multiplex the optical wavelengths in and out RH around the ring 413. Each RH may be assigned one or more wavelengths and different wavelengths may be used for the uplink and downlink. On the BTS host side, wavelength division multiplexers (WDM) 417 and 419 multiplex/demultiplex multiple optical wavelengths in the downlink/uplink (DL/UL) to meet the network data rate needs. For example, baseband RF data supplied from each sites baseband units are supplied by WDM 417 at a different wavelength to optical ring 13.

Figure 5:
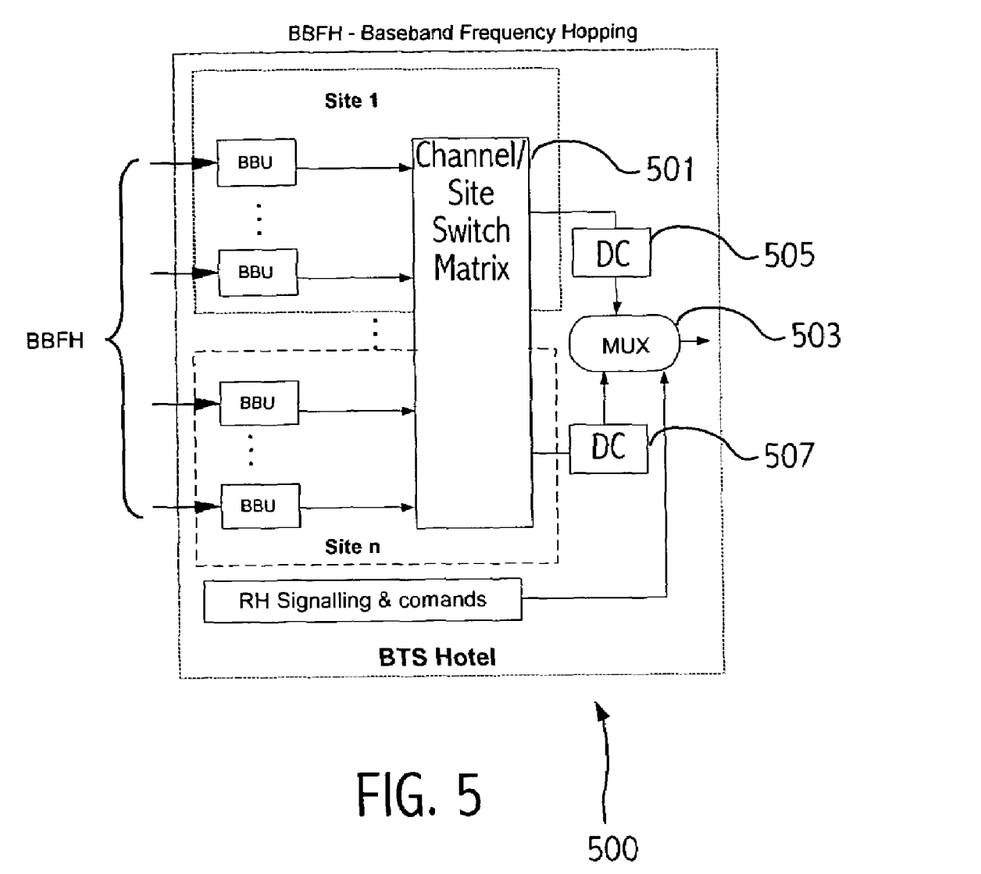
FIG. 5 illustrates an example of BTS host with channel/site multiplexing.

Referring to FIG. 5, effective radio resource allocation can be accomplished by using a switching matrix 501 that routes any radio resource (BBU) within the BTS Host 500 to any remote RH. The channel and site-switching matrix 501 provides the dynamic radio allocation feature. That allows baseband processing resources to be allocated to a site according to its varying utilization of resources. The switching matrix can be looked at as a time switch for all BBU units. Thus, any BBU can be allocated to any particular site. The site multiplexer 503 following the channel/site switching matrix 501 can be incorporated inside the switch matrix. The data compression (DC) modules 503 and 507 are optional data compression modules that compress the data transported over the fiber. In a preferred embodiment, the BTS host is configured to allow the base band resources to be dynamically allocated to any cell site within the network as needed. In certain embodiments, all the baseband resources can be dynamically allocated, while in other embodiments, only a portion of the baseband resources are dynamically allocated to the various sites.

Figure 6:
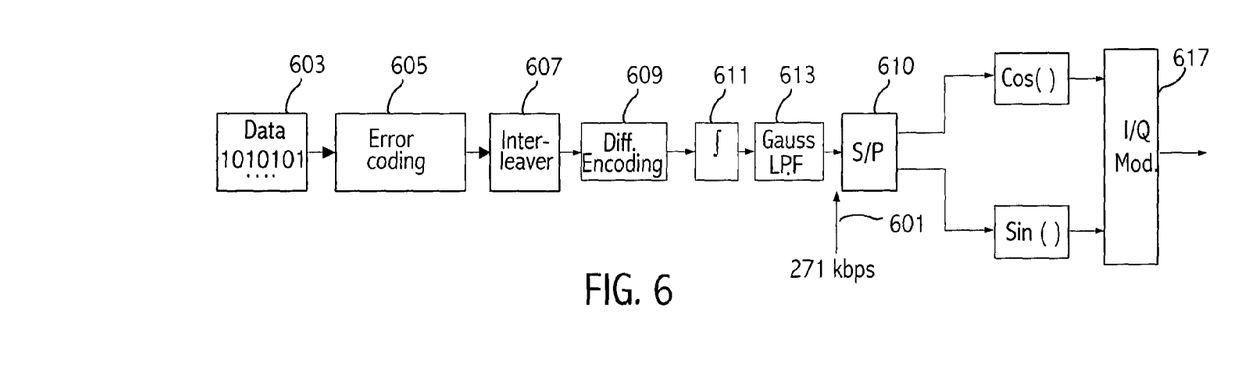
FIG. 6 illustrates an exemplary embodiment of the basic architecture for a base band unit (BBU) for GSM.

Referring to FIG. 6 the basic architecture of a BBU for GSM (single carrier) is illustrated. One potential division point between BBU and RH blocks is indicated by arrow 601, which shows that the data rate at the indicated break point is 271 kps. The blocks shown in FIG. 6 are standard processing blocks and are known to those of skill in the art. As shown in FIG. 6, voice data is received from the BSC at block 603. Error coding is performed in block 605 with interleaving and differential encoding performed in blocks 607 and 609. Integration and a Gaussian low pass filter are implemented in blocks 611 and 613. In one implementation, the signal at that point is forwarded over the optical ring to the RH for serial to parallel (S/P) conversion at 610 and additional processing and RF transmission. Note that in other embodiments, the baseband unit may include additional processing functions. For example, in one embodiment, all the processing up to the in phase and quadrature (I/Q) modulation unit 615 is performed in the BBU.

Figure 7:
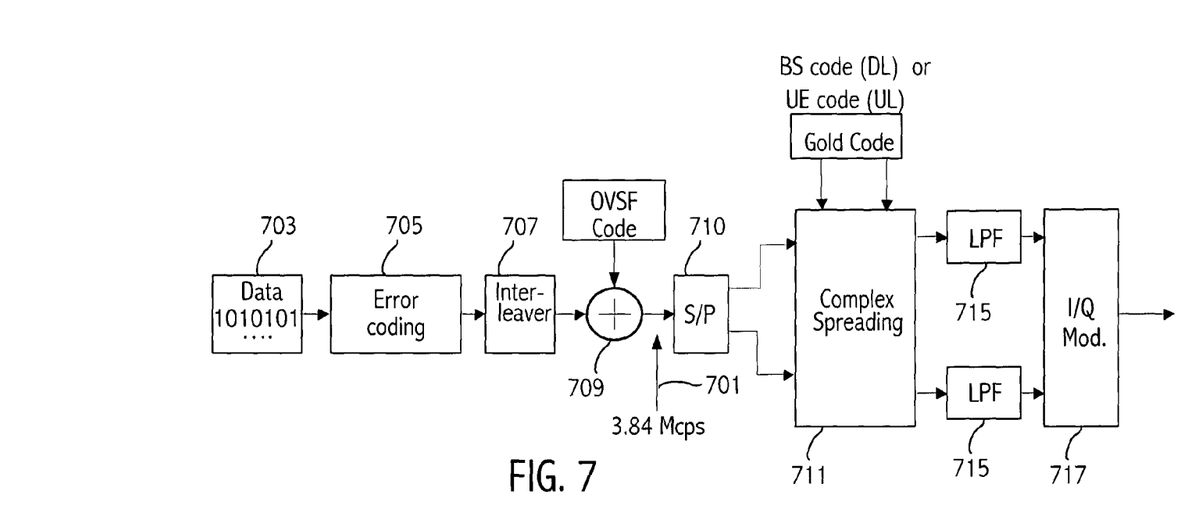
FIG. 7 illustrates the basic architecture of a BBU for use in a Wideband Code Division Multiple Access (WCDMA) system.

FIG. 7 illustrates the basic architecture of a BBU for use in a Wideband Code Division Multiple Access (WCDMA) system. As shown in FIG. 7, voice data is received from the BSC at block 703. Error coding is performed in block 705 with interleaving performed in block 707. Block 708 provides an orthogonal variable spreading factor (OVSF), which is added to the signal in block 709. In one implementation, the signal at that point (701) is forwarded over the optical ring to the RH for serial to parallel (S/P) conversion at 710 and additional processing including complex spreading in block 711, low pass filtering operations in block 715, I/Q modulation in block 717, and RF transmission. Note that the processing blocks illustrated in FIGS. 6 and 7 are known to those of skill in the art and will not be further described herein. Note that other division points between the processing of the BBU and the RH may be utilized by other embodiments of the invention.

An alternative to the implementations illustrated in FIGS. 6 and 7 is for the BBU to construct the composite signal for a given site by the BBU. The composite signal is then digitized and is transmitted to the RH for IF and RF frequency conversion. The tradeoff of this approach is added complexity in the baseband unit and reduced complexity in the RH, while potentially increasing the bandwidth requirements from the host to the RH.

Figure 8:
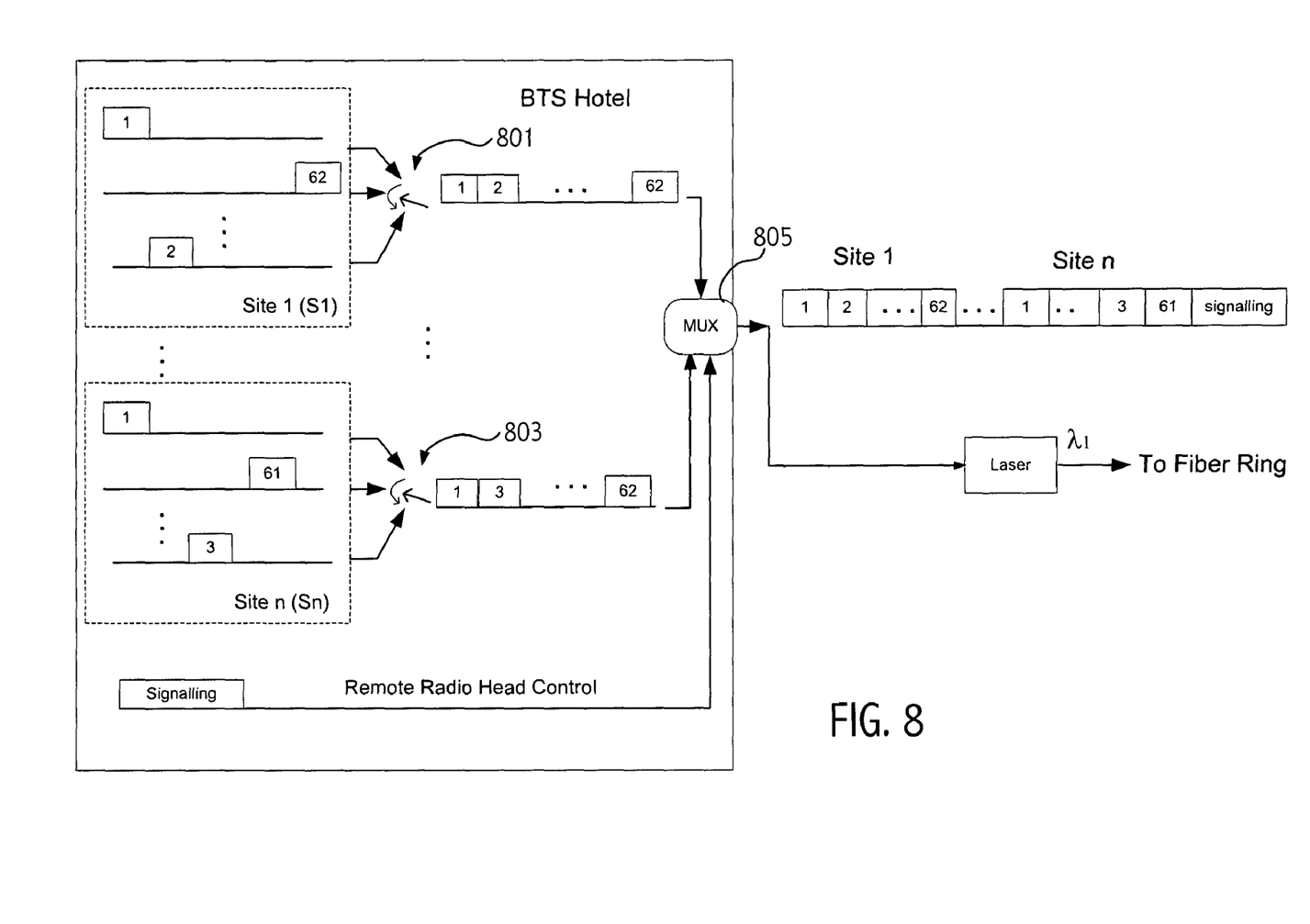
FIG. 8 illustrates an exemplary embodiment of multiplexed baseband and signaling from a BTS hotel to the remote radio head using time division multiplexing for the various sites.

In one embodiment the channels and sites in the downlink (DL) and uplink (UL) are time multiplexed to reduce the transport requirements. In one embodiment the baseband air interface data are transmitted over the fiber and the transmission over the fiber is a digital transmission. An example of multiplexing in the downlink is shown in FIG. 8. The bandwidth needed in this case for the downlink=B*RH, where B is bits/second per carrier and RH is the number of radio heads. It is also assumed that the application used is based on one time slot per mobile. Half Rate AMR users could assume twice the number of users for comparable bandwidth utilization as full rate. On baseband level: The bandwidth needed per carrier is 270 kHz. Assuming sampling at 2× (Nyquist) the sampling frequency is 540 kHz. With 14 bit resolution the total BW needed is =7.6 Mbps. For 20 carriers per sector, and 3 sectors per site, the required transmission is approximately 450 Mbps. With receive diversity, the required bandwidth for the uplink is approximately twice the downlink requirements of 900 Mbps. That is comparable to the bandwidth needed to digitize 12.5 MHz spectrum at the IF. Note that having fewer carriers results in a reduced bandwidth transmission. For example with a site having four carries per sector and three sectors per site will require about 180 Mbps transmission bandwidth (assuming diversity). Due to the current technology limitation of commercial A/D, it is not feasible to do IF digitization of the whole IF spectrum for PCS band (60 MHz). Note that in-band signaling and supervisory alarms/commands between BTS host and RH do not constitute a significant overhead.

Using an optical network of OC-192 (~9.6 Gbps) for the downlink implies that the number of radio heads that can be supported is 20 radio heads. Twice as much bandwidth needs to be allocated to support 20 radio heads for the uplink (assuming diversity). The number of mobiles served by each site, assuming full utilization (1/1 reuse, FH, full-rate AMR and 40% frequency loading) is about 190 mobiles. The total number of simultaneous users supported by one BTS host is therefore about 3800 for the downlink. The bandwidth for each uplink diversity path is equivalent to the downlink since both are using channel multiplexing. However, diversity requires approximately double the transmission bandwidth.

FIG. 8 illustrates an exemplary embodiment of multiplexed baseband and signaling from a BTS hotel to the remote radio head using time division multiplexing for the various sites. As shown, each site, e.g., site 1 requires information packets for various channels 1, 2, and 62. A multiplexer or switch 801 selects which information packet is to be selected for site 1 at any particular time. Similarly a multiplexer or switch 803 selects which information is to be provided to site n. A multiplexer 805 is used to combine the packets or information units to be supplied to the fiber network. The fiber network then receives the various packets destined for the various RH sites, which demultiplex the packets according to signaling (control) information supplied. In-band control messages and supervisory signals between the BTS hotel and the RH are carried over the fiber connection to define RH parameters, site channels, alarms and the like. Critical commands and alarms between RH and BTS are needed for the proper operation of the architecture described herein. For example, such information as output power, antenna voltage standing wave ratio (VSWR) monitoring, tower mounted amplifier (TMA) detection, site environment, TX and RX antenna detection, needs to be communicated between the RH and the BTS hotel. Such control overhead generally does not add significantly to bandwidth requirements. An addressing scheme may be used, in addition to or instead of WDM, to allow the RH to extract its dynamically allocated bandwidth out of the TDM highway between BTS host and RH over the fiber ring. RH remote addressing should be sufficiently robust to allow distinguishing the number of RHs supported by the BTS host. Multi-cast and broadcast addressing schemes may also be desirable. Error detection protocols, e.g., Link Access Protocol D (LAPD), may be utilized for communication between RH and BTS hotel to enable the processing units on both sides to tolerate errors (and therefore not have to throw away all frames with errors). In addition the bit error rate (BER) may be monitored on the link.

One goal for partitioning the BTS host and RH hardware may be to minimize the transport lease of the fiber ring. Multiplexing of the uplink and downlink allows efficient BW utilization over the network, and therefore cost saving over the transport media.

Figure 9:
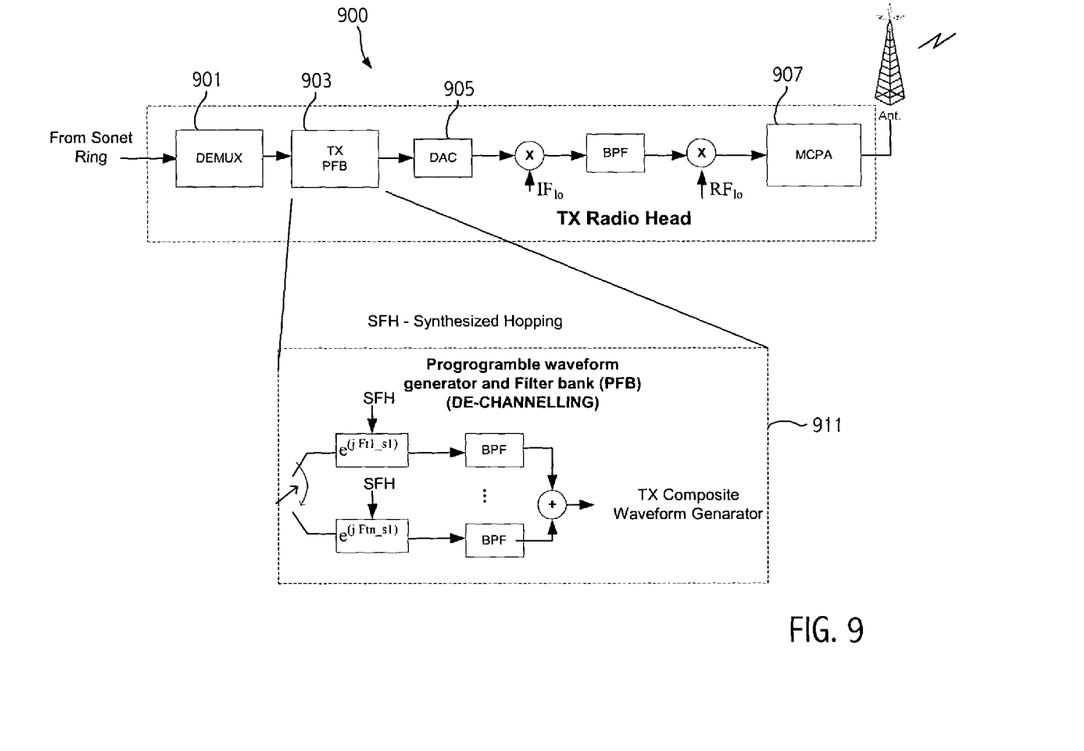
FIG. 9 illustrates an exemplary transmitter configuration for a radiohead.
Figure 10:
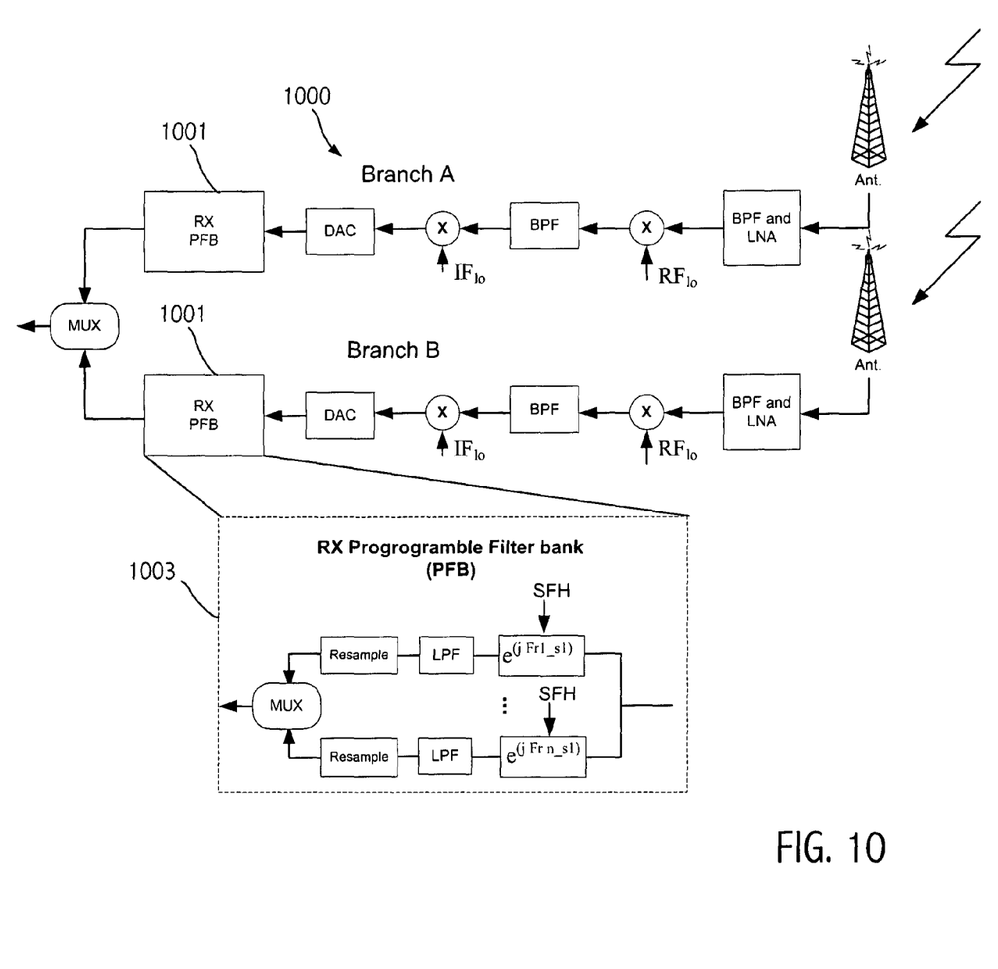
FIG. 10 illustrates an exemplary embodiment of the receive portion of a radio head.

In one embodiment, the remote RH is a simplified BTS with reduced complexity and cost. For example, the baseband processing has been moved into the BTS hotel. The RH covers the same cell area that is covered by current BTS's and can utilize existing poles, antenna, buildings and other structure. With such reduced functionalities and size the site space needed will be reduced resulting in lower lease costs over time. A simplified block diagram of an exemplary RH is shown in FIGS. 9 and 10. FIG. 9 shows the transmit part of the radio head and FIG. 10 shows the receive part of the radio head.

An exemplary transmit configuration 900 is shown in FIG. 9 for one sector. The demultiplexer 901 demultiplexes the optical signal from the SONET ring for the particular site and provides digital data to the transmit programmable filter bank (TX PFB) 903, which functions as a programmable waveform generator and filter bank building the composite signal provided to digital to analog converter (DAC) 905. The programmable waveform generator and filter bank provides an appropriate frequency shift for each channel being transmitted to build the composite signal and is shown in more detail in block 911 where $e^{(jFt1-s1)}$ represents the transmit frequency 1 (Ft1) for site 1 (s1). The various functional block illustrated in FIG. 9 are known in the art and therefore will not be described in detail. The composite radio signal is constructed using the filter bank, translated to RF (first converted to the intermediate frequency (IF) and then the radio frequency (RF) using the local oscillators (lo) in a manner known in the art) and amplified through a Multicarrier Power Amplifier (MCPA). Note that in some embodiments the composite signal generated in FIG. 9 out of block 903 is generated in the base station host and transmitted over the transport medium.

Another alternative (not shown in FIG. 9) is to run individual parallel transmit channels in the RH for every carrier with its own Single Carrier Power Amplifier (SCPA) and provide a power combiner at the antenna point. Low power radios coupled with Multi-carrier power amplifiers or channelized Single Power Carrier Amplifier (SCPA) with combiner systems may used to amplify the carriers at the antenna end. One embodiment may utilize very simple low cost RH's where there are few TRX's, e.g., one or two TRX's, and SCPA's can be used in these applications.

FIG. 10 illustrates an exemplary embodiment of the receive portion 1000 of the RH. The antenna receives the transmitted signal and provides the received signal to band pass filter (BPF) and low noise amplifier (LNA). The processing of the received RF signal is conventional. The receiver carriers are separated through receive filter banks 1001 (additional details of which are shown at block 1003) and are multiplexed, using time division multiplexing (TDM), for transport over the fiber as described previously. Uplink multiplexing is similar to the downlink multiplexing except two receive antennas are used per site. Therefore, the bandwidth used with diversity is twice that carried over the fiber ring if no diversity was used. In addition to allowing the transmission and reception of the carriers of interest on a given sector, it is also desirable for the RH to have the ability to allow for a scanning receiver for a variety of functions such as; uplink interference monitoring, frequency time-slot measurements of other mobile stations (providing, e.g., for the least interfered traffic channel, based on uplink measurement done by the RH and mobile measurement report, to be chosen for the call). Interference monitoring should be continually done by the RH and reported back to the BTS host. The scanning receiver is considered part of the interference measurements for Dynamic Channel Allocation (DCA). Note that the embodiment illustrated in FIG. 10 is exemplary and more or less processing may be performed in the radio head.

As described above, wireless communication systems utilize a timeout period during which the base station expects to hear from the mobile station. In addition, delay is important in appropriately adjusting timing advance associated with the mobile stations. In the architecture described above utilizing optical fiber for the transport medium, a delay is incurred in transporting signals between the base station hotel and the radio head. The signals travel through the optical fiber at 0.68 the speed of free space and the delay encountered through the fiber has to be accounted for by the BTS hotel. As described above, in GSM, the TA (time advance) allowable delay is 63 bit units for round trip delay or 233 μsec. That is equivalent to a cell radius of 35 Km (waves travel 1.1 Km in free space every GSM air interface bit –3.7 μsec–). The mobile is not allowed to transmit if it is more than 35 Km away from the BTS since the burst transmission would be received in the next time slot assigned to another connection even if the timing advance was maximized. Unless otherwise accounted for, the 35 Km cell radius has to be reduced by the equivalent delay through the fiber. The equivalent cell radius if the electromagnetic wave travels through fiber is 35×0.68=24 km. Therefore, if the length of the fiber is 24 km, the allowable cell radius remaining for the wireless portion is zero. That would severely limit the optical transport system proposed herein as the desire is to serve many remote radio heads at significant distances from a base station hotel.

One solution is to calibrate the delay introduced by transmission through the optical fiber between the BTS hotel and each optical splice or remote RH at the time of the installation and periodically thereafter and the BTS hotel can account for the delay in determining time out and/or timing advance periods. Note that since the fiber delay is fixed, it does not cause any more potential overlap or adjacent time slot crosstalk problems than that already introduced by the variable delay from the wireless transmission. In one embodiment, the fixed delay is backed out of any timing calculations performed by the BTS hotel. That is, when a timing parameter is received indicating when a communication was sent by the mobile, the calculated time period between being sent by the mobile and received by the BTS hotel is reduced by the fixed delay associated with the transport medium for communicating with the particular radio head in communication with the mobile requiring timing advance or timeout evaluation. Each of the radio heads is going to have its own fixed delay period based on its fiber delay to the BTS hotel and the BTS hotel utilizes the appropriate fixed delay according to which of the radio heads it is communicating with.

Figure 11:
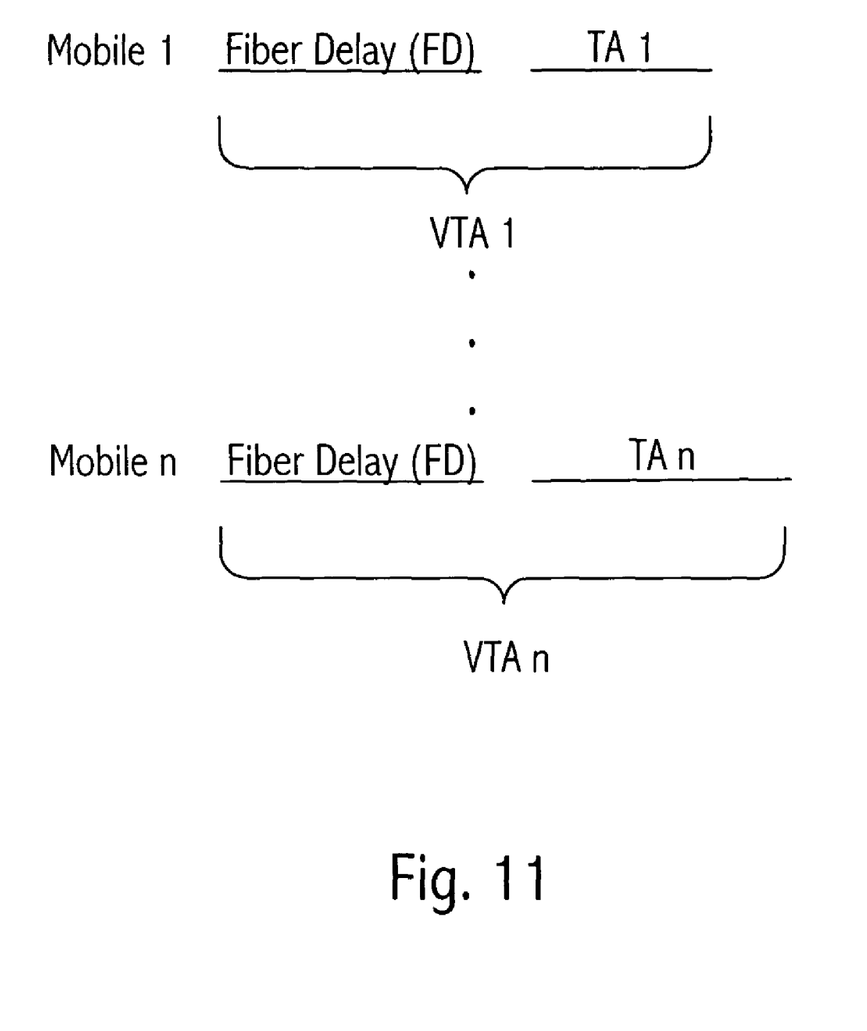
FIG. 11 illustrates an exemplary embodiment of the BTS host accounting for the fixed fiber delay via increases to the timeout counter.

In one embodiment, the BTS host takes this extra fixed fiber delay into account via increases, which may be implemented in software, to the timeout counter as shown in FIG. 11. The mobile and the BSC both process the signal normally as if no extra delay were introduced by the fiber transmission. The new timeout is defined as the Virtual Timing Advance (VTA) for a particular mobile. All RF radio frequencies or carriers connected to that site, and hence their respective mobiles, incurs the same delay caused by the optical fiber. The BTS software assumes that constant delay during the synchronization to all mobiles of that particular site. Referring still to FIG. 11, the BTS software requests that the respective mobile advances its transmission by the normal delay (TA n), which is the virtual delay minus fiber delay (VTA n–FD). The BTS still reports to the BSC only the "TA n" part of the delay for use by any algorithms utilizing the TA implemented by the BSC. In prior art systems, the base transceiver station (BTS) was located in close proximity to the air interface with the mobile station so that the delay due to communication with the BTS could be neglected.

A transmission by the mobile includes a time stamp. The BTS host receives that time stamp and determines a delay associated with receiving that transmission from the mobile. That delay is the VTA and includes both the FD and TA n (FIG. 11). The host can either add the fixed delay to its TA n calculations when comparing to the VTA or subtract out the fixed delay from the VTA.

In one embodiment, the BTS uses a virtual TA (VTA) of up to 63+156 bits (one time slot extra delay) and reports the TA delay to the BSC instead of VTA, since the extra delay incurred by the fiber can be accounted for conceptually. Larger delays than 156 bits might not be practical since the amount of jitter and wander inherent in larger delays could complicate radio synchronization. The fiber delay between the BTS host and RH can be calibrated at installation time and periodically through the network. Various methods are known to determine delay of the transport medium. For example, a packet or frame may be transmitted by the BTS hotel that is returned to the BTS hotel. The BTS hotel can determine the round trip time to determine the delay inherent in the transport medium. Alternatively, a global positioning system (GPS) time stamp may be inserted in a packet or frame sent between the BTS hotel and the RH with the receiving side utilizing a GPS time stamp on receipt to enable determination of delay caused by the fiber (or other transport media).

One goal of any architecture is to decrease the CAPEX and OPEX costs of the system over time. Software defined radio (SDR) provides the versatility to support multiple standards on the same platform. SDR may be utilized to provide versatility in the evolution to WCDMA, High Speed Downlink Packet Access (HSDPA), as well as supporting other air interfaces such as 802.XX. To this end, one BTS host architecture is based on standard off-the-shelf platforms that run standard operating systems, where the air interfaces are pure software implementations on top of the stand platforms. For instance, the evolution of PC architectures with standard off the shelf microprocessors in redundant server architecture and shared operating systems such as Linux are possible implementation solutions for the BTS host. In this embodiment, an operator buys the software libraries for a certain release from a GSM vendor, which would run on a standardized platform. In this manner, upgrades and the cost of the BTS host platform will naturally follow the efficiency and cost curves of the PC industry. Reliability is of course an important criterion for hardware. Note that application of SDR concepts to the radio head may be less advantageous as most of the functionality in the radio head is processing or amplification that is needed anyway even if all the extra processing was done in software.

A variety of dynamic resource sharing algorithms and techniques methods and concepts are possible with the BTS host, RH architecture described herein. In addition to being able to dimension radio resources on equivalent to a switch or BSC level, rather than needing to dimension each BTS to satisfy the demands of its individual busy hour, there are other radio resource efficiencies and algorithms that are possible with this architecture. For instance, simulcast capability is provided by sending the signal to two RH's simultaneously. Bandwidth efficient implementations (over the fiber ring) of simulcast may have both radio heads listen to the same signal being sent over fiber as well. That is, a multicast capability is provided over the fiber ring so that multiple radio heads can be targeted for a particular communication from the BTS hotel. Macro-diversity can be also achieved by having two radio heads listen to the same signal, which is then combined in the BTS host. Smart Antenna beam steering can also be conceptually done by sending the steering signals to multiple RH's which are estimated to provide an improved signal to a given mobile, or nulling towards an interferer. In addition, smart resource allocation for hopping signals in a synchronized network to avoid collisions can also be implemented.

In order to minimize the cost associated with the proposed architecture, the current BTS architecture should be configured to allow an appropriate interface to the network model described herein. In addition, it is desirable to standardize the interface of the BBU and RH between multiple vendors so that different vendors can share the network.

In GSM and EDGE, the power control is not as timely and critical as in CDMA2000 or WCDMA. The RH needs to periodically report the output power and antenna monitoring signals at the remote side to the BTS host. If RF signals are transferred over the fiber (rather than baseband or IF), the RH need to account for the loss through the fiber ring to maintain the proper output power level at the antenna and prevent saturating the power amplifier (PA). The BBU can provide the proper power control level on a time slot basis.

In one embodiment, the down link power control for a given user (slot in a TDMA system) is done in the BBU. The RH should maintain a constant gain in the up and down links for all the channels. A power monitoring function should exist in the RH for the downlink and looped back to the BTS host respective site supporting the RH for further power equalization and balance.

The radio heads should be synchronized to the same BTS host. One synchronization approach is to use the GPS currently used in positioning to time stamp a GSM frame, or alternatively a new sync frame or word defined for the fiber transport. BTS host to BTS host synchronization may be accomplished by utilizing synchronization messages between the hosts that compare the time stamps of their respective GPS receiver.

Centralized operation and maintenance are one of the advantages that the various embodiment of the invention described herein provide over the existing scheme.

As in any architecture change, the new architecture needs to be phased in with the existing architecture. New equivalent base stations could be deployed with the new architecture, however, it may also be beneficial to pull back the backhaul of the existing systems in some multiplexing fashion on the fiber ring as well. One embodiment of a network based on the new architecture is to use a large number of radio head and lower transmitter power. The RHs could also be deployed in the existing sites to maintain a uniform low output distribution, which allows the mobile to operate at a lower output power thereby extending the battery lifetime.

While various aspects of a new architecture have been described herein, note that the description of the invention set forth herein is illustrative, and is not intended to limit the scope of the invention as set forth in the following claims. For example, while a network ring has been described utilizing SONET, various networks, technologies, or transport media such as PDH, ATM, or Ethernet networks could all be used to transport signals between the BTS hotel and the RH. The link between the BTS hotel and the RH may be a point to point connection implemented in FSO or MW. Also, various processors may be used and various implementations of the link are possible. Other variations and modifications of the embodiments disclosed herein, may be made based on the description set forth herein, without departing from the scope of the invention as set forth in the following claims

What is claimed is:

1. A method for use in a cellular communications system having a centralized radio processing portion (hotel) in communication with a plurality of remote air interface radio portions (RH) over a transport medium, the method comprising:

in the centralized radio processing portion, compensating for a fixed delay associated with the transport medium coupling the centralized radio processing portion and one of the remote air interface radio portions in evaluating a time period corresponding to a variable delay between a transmission by a mobile station and receipt of the transmission by the centralized radio processing portion, the mobile station communicating with the one of air interface radio portions, the transmission being received by the centralized radio processing portion from the one of the remote air interface radio portions;

wherein the evaluating is for synchronizing calls by adjusting a transmission timing of the mobile station according to the evaluation of the time period corresponding to the variable delay; and wherein the compensating for the fixed delay includes subtracting out the fixed delay in a calculation of the time period corresponding to the variable delay.

2. A method for use in a cellular communications system having a centralized radio processing portion (hotel) in communication with a plurality of remote air interface radio portions (RH) over a transport medium, the method comprising:

in the centralized radio processing portion, compensating for a fixed delay associated with the transport medium coupling the centralized radio processing portion and one of the remote air interface radio portions in evaluating a time period corresponding to a variable delay between a transmission by a mobile station and receipt of the transmission by the centralized radio processing portion, the mobile station communicating with the one of air interface radio portions, the transmission being received by the centralized radio processing portion from the one of the remote air interface radio portions; and wherein the compensating comprises increasing a first time period corresponding to receipt of the transmission at the one of the remote air interface radio portions, by a second time period corresponding to the fixed delay.

3. The method as recited in claim 2 wherein the first time period is a time out period within which the centralized radio processing portion expects a communication to be received by the one of the remote air interface radio portions.

4. The method as recited in claim 3 wherein a call from the mobile station is dropped if the receipt of the communication from the mobile station is received after a third time period equal to the first plus the second time periods.

5. The method as recited in claim 2 wherein the first time period is an adjustable timing advance time period used to avoid overlap in time slots with another mobile station.

6. The method as recited in claim 1 the mobile station is provided a timing adjust value independent of the fixed delay.

7. The method as recited in claim 1 further comprising utilizing a calibrated value for the fixed delay.

8. The method as recited in claim 1 wherein a plurality of remote air interface radio portions are coupled via the transport medium to the centralized radio processing portion, and wherein the centralized radio processing portion accounts for a different fixed delay for each of the remote air interface radio portions.

9. The method as recited in claim 1 wherein the transport medium is optical fiber.

10. The method as recited in claim 1 wherein the transport medium is one of free state optical and microwave.

11. The method as recited in claim 1 further comprising supplying a base station controller (BSC) with the variable delay.

12. A cellular communication system comprising:

a host processing part coupled to receive a communication over a transport medium from a remote air interface part, the host processing part configured to evaluate a time interval between transmission by a mobile station in communication with the remote air interface part and receipt of the transmission at the host processing part, the host processing part configured to compensate for a fixed delay associated with the transport medium coupling the host processing part and the remote air interface part in evaluating the time interval;

wherein the host processing part is further coupled to receive respective communications over the transport medium from a plurality of other remote air interface parts, each of the other remote air interface parts having respective fixed delays over the transport medium different from the fixed delay associated with the remote air interface part;

wherein the host processing part is configured to evaluate the time interval to synchronize calls by adjusting a transmission timing of the mobile station according to the evaluation of the time interval; and wherein the host processing part is configured to compensate for the fixed delay by subtracting out the fixed delay to evaluate the time interval.

13. The cellular communication system as recited in claim 12 comprising a counter coupled to account for the fixed delay.

14. The cellular communication system as recited in claim 13 wherein the counter is implemented in software.

15. The cellular communication system as recited in claim 12 wherein the time interval is a sum of a first time period corresponding to receipt of the transmission at the remote air interface part and the fixed delay.

16. The cellular communication system as recited in claim 12 wherein the time interval corresponds to a timing advance time period summed with the fixed delay, the timing advance period being used to avoid overlap in time slots with another mobile station.

17. The cellular communication system as recited in claim 12 wherein the fixed delay is a measured value.

18. The cellular communication system in claim as recited in claim 12 wherein the transport medium is an optical fiber.

19. The cellular communication system as recited in claim 12 wherein the transport medium is one of free state optical and microwave.

* * * * *

UNITED STATES PATENT AND TRADEMARK OFFICE
CERTIFICATE OF CORRECTION

PATENT NO. : 7,493,129 B1
APPLICATION NO. : 10/661196
DATED : February 17, 2009
INVENTOR(S) : Ayman Mostafa et al.

It is certified that error appears in the above-identified patent and that said Letters Patent is hereby corrected as shown below:

Col. 1, line 24, please replace "adjusteds," with --adjusted,--
Col. 1, line 37, please replace "that the" with --the--
Col. 1, line 44, please replace "know" with --known--
Col. 5, line 56, please replace "for given" with --for a given--
Col. 6, line 12, please replace "that the" with --that in the--
Col. 7, line 59, please replace "carries" with --carriers--
Col. 9, line 9, please replace "block" with --blocks--
Col. 9, line 26, please replace "may used" with --may be used--
Col. 9, line 45, please replace "such as;" with --such as--
Col. 12, line 3, please replace "need to" with --needs to--
Col. 12, line 23, please replace "embodiment" with --embodiments--
Col. 13, line 39, claim 6, please replace "claim 1 the" with --claim 1 wherein the--
Col. 14, line 45, claim 18, please replace "system in claim as" with --system as--

Signed and Sealed this

Twenty-first Day of April, 2009

JOHN DOLL
*Acting Director of the United States Patent and Trademark Office*